(12) United States Patent
Sano et al.

(10) Patent No.: US 8,286,924 B2
(45) Date of Patent: Oct. 16, 2012

(54) CLIP

(75) Inventors: Takahiro Sano, Toyohashi (JP); Tsutomu Sakata, Yokkaichi (JP)

(73) Assignee: Sumitomo Wiring Systems, Ltd (JP)

( * ) Notice: Subject to any disclaimer, the term of this patent is extended or adjusted under 35 U.S.C. 154(b) by 0 days.

(21) Appl. No.: 13/129,921

(22) PCT Filed: Nov. 27, 2009

(86) PCT No.: PCT/JP2009/070006
§ 371 (c)(1),
(2), (4) Date: May 18, 2011

(87) PCT Pub. No.: WO2010/073872
PCT Pub. Date: Jul. 1, 2010

(65) Prior Publication Data
US 2011/0239412 A1    Oct. 6, 2011

(30) Foreign Application Priority Data

Dec. 24, 2008   (JP) .................................. 2008-327755

(51) Int. Cl.
*F16L 3/08* (2006.01)
*B65D 63/10* (2006.01)
(52) U.S. Cl. ........ 248/74.3; 248/71; 174/72 A; 411/508; 24/16 R; 24/297

(58) Field of Classification Search ................. 248/74.3, 248/74.1, 71, 73, 74.5; 411/510, 913, 182, 411/508, 509; 24/16 R, 297; 174/72 A, 135, 174/138 G, 154
See application file for complete search history.

(56) References Cited

U.S. PATENT DOCUMENTS

| 3,413,690 | A | | 12/1968 | Pearson et al. | |
|---|---|---|---|---|---|
| 5,448,809 | A | * | 9/1995 | Kraus | ............................. 24/453 |
| 5,842,822 | A | | 12/1998 | Everett et al. | |
| D413,508 | S | * | 9/1999 | Shibao | ........................... D8/382 |
| 5,947,631 | A | * | 9/1999 | Hironaka et al. | .............. 403/397 |
| 6,575,681 | B2 | * | 6/2003 | Kojima et al. | ................. 411/508 |
| 7,019,215 | B2 | * | 3/2006 | Arai | ............................ 174/72 A |

(Continued)

FOREIGN PATENT DOCUMENTS

JP    51-5933    1/1976

(Continued)

*Primary Examiner* — Anita M King
(74) *Attorney, Agent, or Firm* — Gerald E. Hespos; Michael J. Porco

(57) ABSTRACT

A clip has elastic locking claws at a fixing section to be inserted in a hole of a member. The fixation section (3) of the clip (1) is a hollow box-shaped block and has a rectangular or oval shape with two opposite long sides (L1, L2) and two opposite short sides (S1, S2). The locking claws (15) form a part of the associated long side. One of the locking claws (15) is provided in a diagonal direction relative to the other in the lateral cross section of the fixing section. The locking claws are connected to each other in a space (18) at the center of the fixing section by an elastic claw-connecting section (19). The claw-connecting section (19) applies to the locking claws elasticity that causes the locking claws to project outward. Thus, the elastic locking claws have increased locking force.

6 Claims, 5 Drawing Sheets

U.S. PATENT DOCUMENTS

| | | | |
|---|---|---|---|
| 7,179,013 B2 * | 2/2007 | Benedetti | 403/388 |
| 7,229,052 B2 * | 6/2007 | Takeuchi | 248/71 |
| 7,291,931 B2 * | 11/2007 | Kirikoshi et al. | 257/798 |
| 7,337,505 B1 * | 3/2008 | Scroggie et al. | 24/297 |
| 7,594,629 B2 * | 9/2009 | Smutny et al. | 248/71 |
| 7,757,997 B2 * | 7/2010 | Smutny et al. | 248/71 |
| 2004/0223805 A1 * | 11/2004 | Benedetti et al. | 403/316 |

FOREIGN PATENT DOCUMENTS

| | | |
|---|---|---|
| JP | 1-156304 | 10/1989 |
| JP | 3-30682 | 3/1991 |
| JP | 4-36112 | 3/1992 |
| JP | 8-142730 | 6/1996 |
| JP | 2001-072123 | 3/2001 |

* cited by examiner

Fig. 1A
Fig. 1B
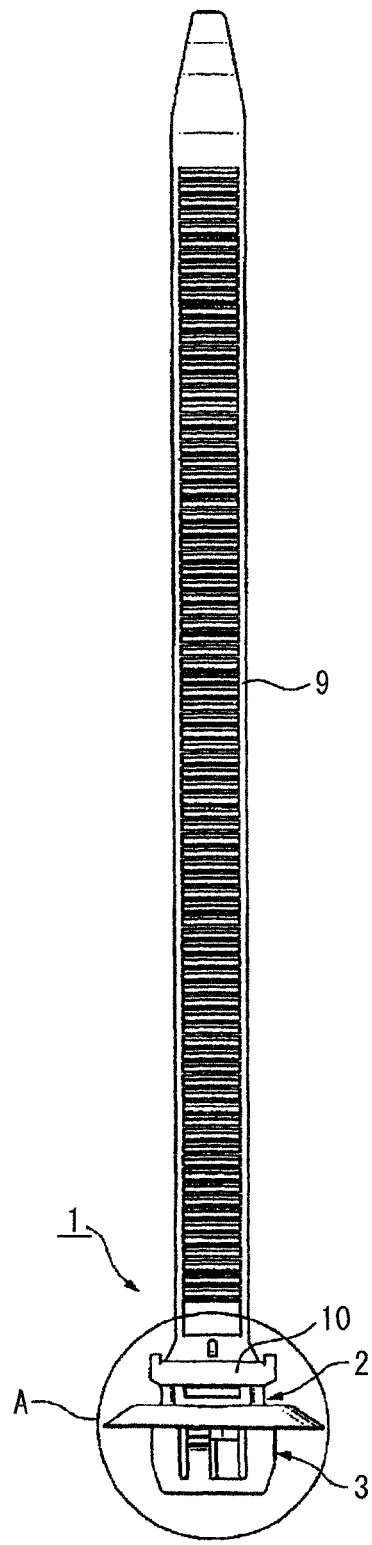
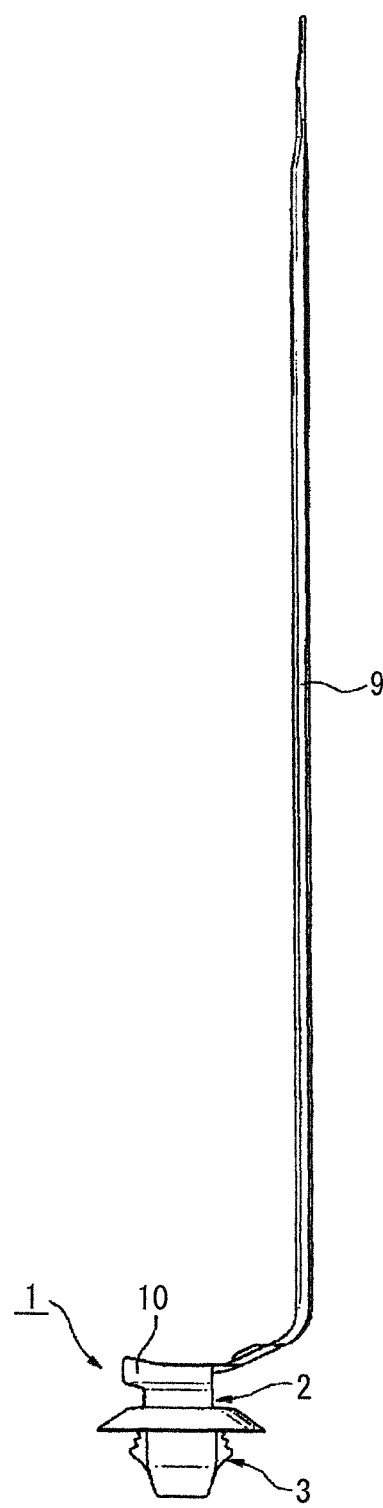

CLIP

BACKGROUND OF THE INVENTION

1. Field of the Invention

The present invention relates to a clip to be mounted on a member such as a panel on which the clip is to be mounted by inserting the clip into a mounting hole thereof. For example, the present invention relates to a clip suitable for mounting a long member such as a wire harness held thereby on the member on which the clip is to be mounted.

2. Description of the Related Art

An example of a clip which is suitable for holding a long member such as a wire harness and mounting the long member held thereby on a member such as a panel on which the clip is to be mounted is described in Japanese Patent Application Laid-Open No. 2001-072123. The clip has the band and the buckle formed on the main body thereof and is capable of holding the wire harness around which the band is wound. A locking claw which is inserted into a mounting hole of the member on which the clip is to be mounted and locked to the mounting hole is formed on the fixing part integral with the main body. By inserting the fixing part into the mounting hole of the member on which the clip is to be mounted, the clip is mounted on the member. The fixing part is so formed as to have a rectangular contour having a pair of long sides and a pair of short sides in its cross section to prevent the clip from being shaken relative to the member on which the clip is to be mounted. The locking claws are formed at the long side of the fixing part in such a way that in the cross section of the fixing part, one of the locking claws is disposed diagonally to the other locking claw to facilitate molding.

In the clip of Japanese Patent Application Laid-Open No. 2001-072123, after the clip is mounted on the mounting hole of the member on which the clip is to be mounted, the force of locking the fixing part to the mounting hole depends on only the locking force of the locking claw. Therefore there is room for improvement.

In the clip described in Japanese Utility Model Application Laid-Open No. 51-005933, the front end of a pair of the anchor leg-shaped locking claws forming the fixing part is connected to the column portion disposed at the center in the fixing part with the flexible connection piece in such a way that the open degree of both locking claws is restricted to a certain range. Thereby the anchor leg-shaped locking claws are prevented from opening excessively. The clip does not have a construction of increasing the locking force of the locking claws.

Each of the clips described in Japanese Utility Model Application Laid-Open No. 3-030682 and Japanese Patent Application Laid-Open No. 8-142730 has a construction in which after the clip is mounted on the member on which the clip is to be mounted by inserting the fixing part into the mounting hole of the member on which the clip is to be mounted and by locking the locking claw to the edge of the mounting hole, the clip can be removed from the member on which the clip has been mounted without damaging the locking claw. In the clip of Japanese Utility Model Application Laid-Open No. 3-030682, the front ends of a pair of the anchor leg-shaped locking claws are connected to each other with the band-shaped piece. To unlock the edge of the mounting hole from the locking claws, the band-shaped piece is pressed into the mounting hole by means of the front end of the tool. As a result, the front ends of a pair of the locking claws approach to each other. Thereby the edge of the mounting hole is unlocked from the locking claws. In the clip of Japanese Patent Application Laid-Open No. 8-142730, the tubular part into which the front end of the tool can be inserted is provided at a portion intermediate between a pair of the locking claws. The tubular part is connected to the front ends of both locking claws with the band-shaped piece. When the tubular part is rotated by inserting the front end of the tool thereinto, both locking claws flex inward. Thereby the edge of the mounting hole is unlocked from the locking claws. Although the clip has the connection piece for unlocking the edge of the mounting hole from the locking claws, the clip does not have a construction of increasing the locking force of the locking claws.

Therefore it is an object of the present invention to increase the locking force of an elastic locking claw of a fixing part of a clip to be inserted into a mounting hole of a member on which the clip is to be mounted.

SUMMARY OF THE INVENTION

To solve the above-described problem, the present invention provides a clip having a fixing part inserted into a mounting hole of a member on which the clip is to be mounted and a main body formed integrally with the fixing part, wherein when the fixing part is inserted into the mounting hole of the member on which the clip is to be mounted, an elastic locking claw formed on the fixing part and the main body sandwich the member on which the clip is to be mounted therebetween with the elastic locking claw being locked to an edge of the mounting hole, whereby the clip is mounted on the member on which the clip is to be mounted. The fixing part is composed of a hollow box-shaped block consisting of a pair of columns extended from the main body and a plate-shaped body connecting end portions of a pair of columns to each other; and the fixing part composed of the hollow box-shaped block is so formed as to have a rectangular or oblong contour having a pair of opposed long sides and a pair of short sides in a cross section of the fixing part. The locking claw is projected from a pair of the plate-shaped body toward the main body to form a part of each of the long sides. A pair of the locking claws is so disposed that the one locking claw is diagonal to the other locking claw; a front end of the one locking claw and a front end of the other locking claws are connected to each other with an elastic locking claw connection piece consisting of a thin band-shaped strip in a space disposed at a center of the fixing part. The locking claw connection piece is so formed as to apply elasticity to a pair of the locking claws to allow the locking claws to protrude outward.

The fixing part of the clip is so formed as to have a rectangular or oblong contour in its cross section. A pair of the locking claws disposed diagonally along the long sides is connected to each other with the elastic locking claw connection piece. Besides the elasticity of a pair of the locking claws, the locking claw connection piece imparts elasticity to a pair of the locking claws to allow the locking claws to protrude outward. Therefore the locking claw connection piece increases the locking force of the locking claws. Thereby the locking claw connection piece compensates a low rigidity of the locking claws and allows the clip to be firmly fixed to the member on which the clip is to be mounted. The locking claws are so formed as to form a part of each of the long sides and can be shifted longitudinally relative to the oblong mounting hole of the member on which the clip is to be mounted. Therefore in inserting the fixing parts into a plurality of the mounting holes respectively, it is possible to absorb a variation in the pitch between clip-mounting positions or a variation in the pitch between mounting holes.

In the clip, the two short sides of the fixing part consist of a rigid column respectively in the cross section. The long sides are constructed of the locking claws and a space disposed between the locking claws and the short sides. An end portion of the box-shaped block forming the fixing part is constructed of a rigid plate-shaped body connecting end portions of the two columns to each other. This construction allows the fixing part to have a high rigidity and is capable of decreasing shaking of the clip in mounting the fixing part on the mounting hole of the member on which the clip is to be mounted and improving a mounting strength. In this case, the locking claws consist of an elastic piece extended in a direction from the end portion of the rigid plate-shaped body forming the fixing part toward the main body. The locking claw connection piece consists of a thin band-shaped strip connecting front ends of a pair of the locking claws to each other. The locking claw connection piece is so formed as to be flexed in an approximately S configuration in the cross section owing to inward falling of the locking claws when the fixing part is inserted into the mounting hole of the member on which the clip is to be mounted. Thereby when the locking claws flex inward, an easy fixing part insertion operation can be maintained without the locking claw connection piece obstructing the flexing thereof. A flange having an elastic peripheral edge is formed at a position of the main body adjacent to the fixing part. Thereby the peripheral edge of the flange is capable of absorbing the shaking of the clip in sandwiching the member on which the clip is to be mounted between the locking claws and the flange and enhances the locking force of the locking claws.

The main body is provided with a band wound around a long member such as a wire harness and a buckle holding a state in which the band is wound around the long member. The band and the buckle are formed on the main body in such a way that the long member is held by the main body with a longitudinal direction of the long member being disposed along the long sides of the fixing part. This construction allows the long member such as the wire harness to be mounted on the member such as a panel on which the clip is to be mounted. In addition, when the mounting holes of the member on which the clip is to be mounted are formed as oblongs long in the longitudinal direction of the long member in mounting the long member on the member on which the clip is to be mounted at a plurality of positions thereof, it is possible to absorb dislocation of the clip in the longitudinal direction of the long member or a variation in the pitch between the mounting holes.

BRIEF DESCRIPTION OF THE DRAWINGS

FIG. 1 shows a clip according to an embodiment of the present invention, in which (A) is a front view of the clip and (B) is a right side view of the clip.

DETAILED DESCRIPTION OF THE PREFERRED EMBODIMENTS

Figure 7:
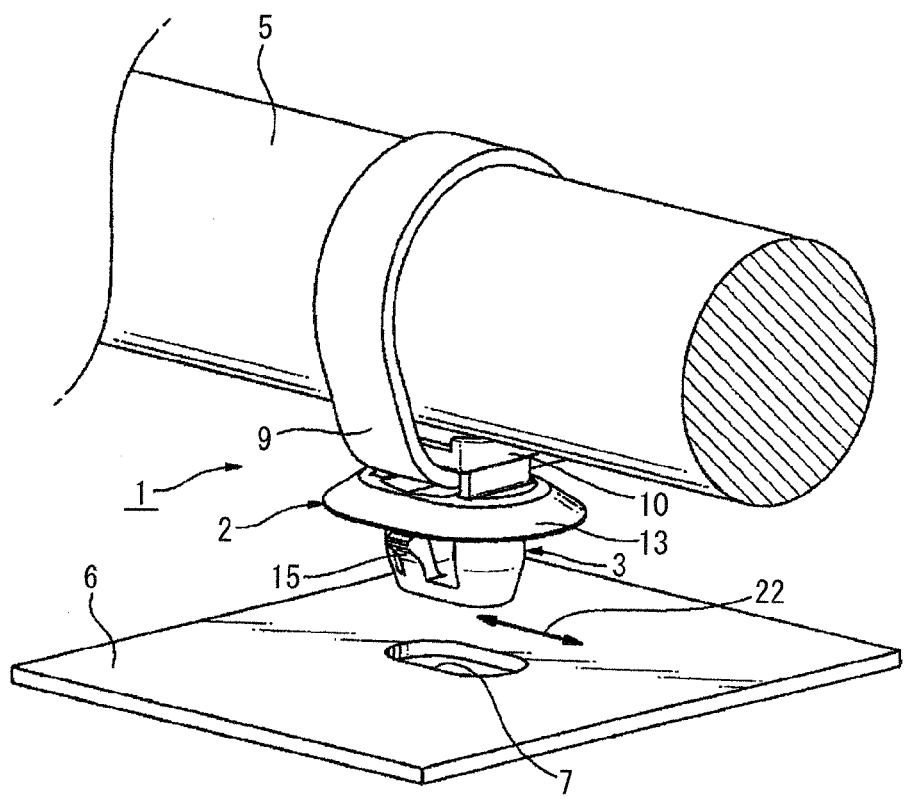
FIG. 7 is a perspective view showing a state before the clip holding a wire harness is mounted on a panel.
Figure 8:
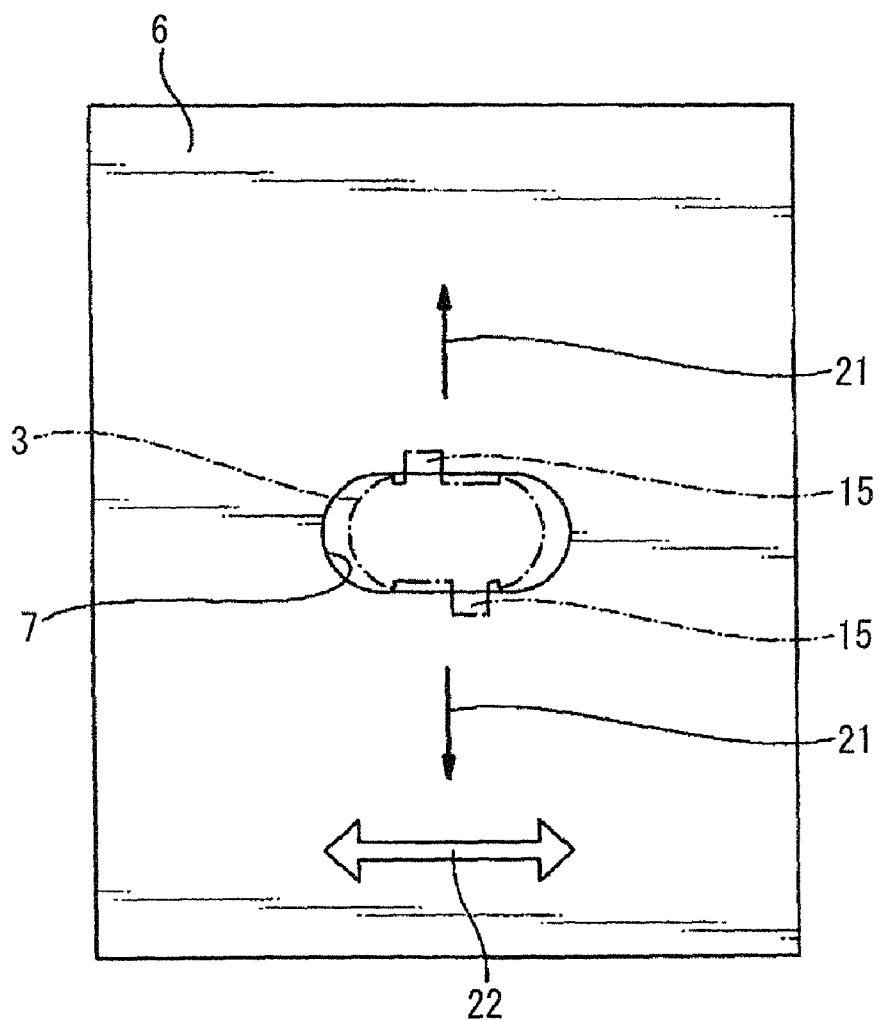
FIG. 8 shows the relationship between a mounting hole of the panel and the fixing part as well as locking claws.

A clip according to one embodiment of the present invention is described below with reference to the drawings. In the embodiment shown in the drawings, a clip 1 is formed as a band clip to be mounted on a member such as a panel on which the clip 1 is to be mounted with the clip 1 holding a long member such as a wire harness. FIGS. 1(A), 1(B) show the entire clip 1 according to the embodiment. FIGS. 2 through 6 show details of a main body 2 of the clip 1 and a fixing part 3 thereof surrounded with a circle A of FIG. 1(A). FIG. 7 shows a state before the clip 1 holding a wire harness 5 which is the long member is mounted on a mounting hole 7 of a panel 6 which is the member on which the clip 1 is to be mounted. FIG. 8 shows that the clip 1 is capable of absorbing a variation in the pitch between clip-mounting holes or a variation in the clip-mounting pitch.

The clip 1 is formed by integrally molding plastic. In the embodiment shown in FIGS. 1(A) and 1(B), the clip 1 is composed of the main body 2 holding the long member such as the wire harness 5 and the fixing part 3 fixing the long member such as the panel 6 to the member on which the clip 1 is to be mounted. The main body 2 is provided with a band 9 holding the long member and a buckle 10 locking the band 9 in a state in which the long member is held by the band 9 wound around the long member. A guide hole for receiving the band 9 is formed through the buckle 10. A locking claw 11 (see FIG. 4) firmly locking the band 9 in a state in which the band 9 is wound around the long member is formed in the guide hole. A multi-stage ratchet claw is formed longitudinally on a surface of the band 9 to be locked to the locking claw to lock the long member such as the wire harness in a state in which the long member is firmly held by the band 9. In the embodiment shown in the drawings, the clip 1 is shown as a band clip holding the long member such as the wire harness. But for example, the clip 1 may be a clip, not having the band, for mounting a mounting member on the member on which the clip is to be mounted or a clip of a type to be fixed to the member on which the clip is to be mounted by inserting the fixing part thereof into the mounting hole of the member on which the clip is to be mounted.

With reference to FIGS. 2 through 6, the construction of the main body 2 of the clip 1 and that of the fixing part 3 thereof are described in detail below. The main body 2 has the above-described band 9 and buckle 10 formed on its upper surface. The fixing part 3 is integral with a lower surface of the main body 2 and hangs from the lower surface thereof. A flange 13 having a large diameter is formed at a position of the main body 2 adjacent to the fixing part 3. The diameter of the flange 13 is so set that the flange 13 does not pass through the mounting hole of the member on which the clip 1 is to be mounted. The peripheral edge of the flange 13 is formed in the shape of a sucker, thus having elasticity of pressing the member on which the clip 1 is to be mounted. Thereby peripheral edge of the flange 13 is capable of absorbing shaking of the clip 1 after the clip 1 is mounted on the member on which the clip 1 is to be mounted and enhances the locking performance of the locking claw of the fixing part 3.

Figure 2:
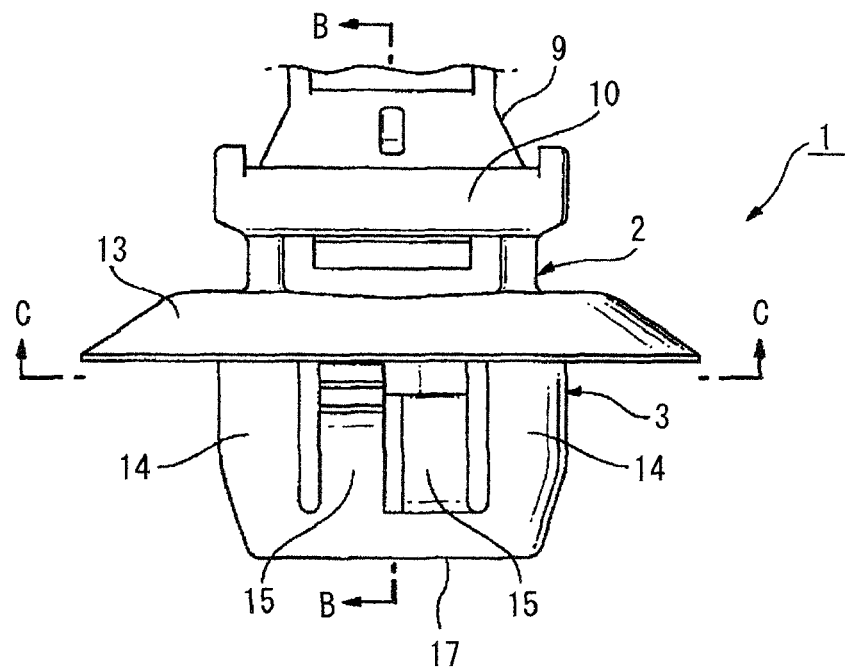
FIG. 2 is a front view of a main body of the clip and a fixing part thereof surrounded with a circle A of FIG. 1(A).
Figure 3:
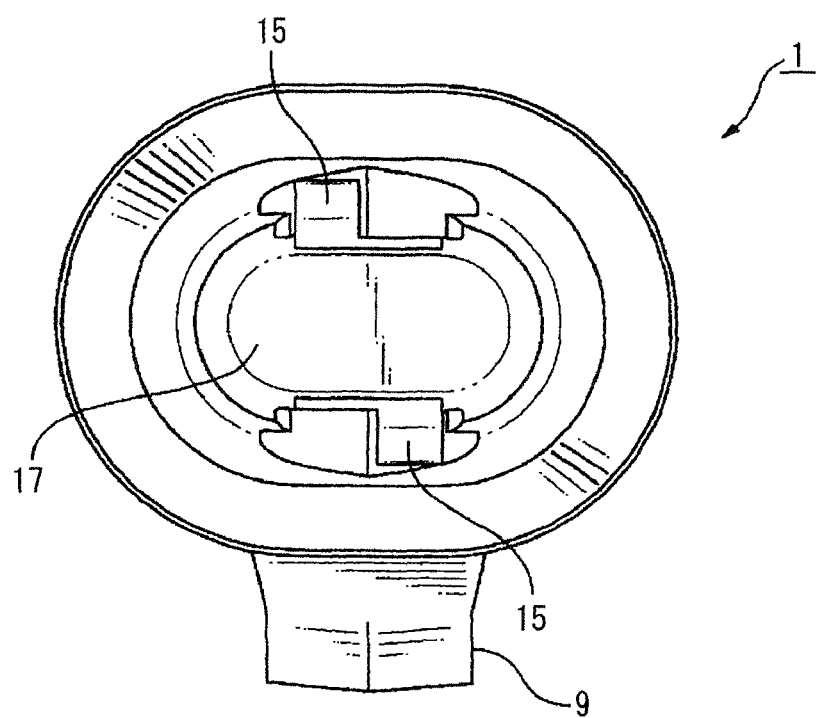
FIG. 3 is a bottom view of the clip of FIG. 2.
Figure 5:
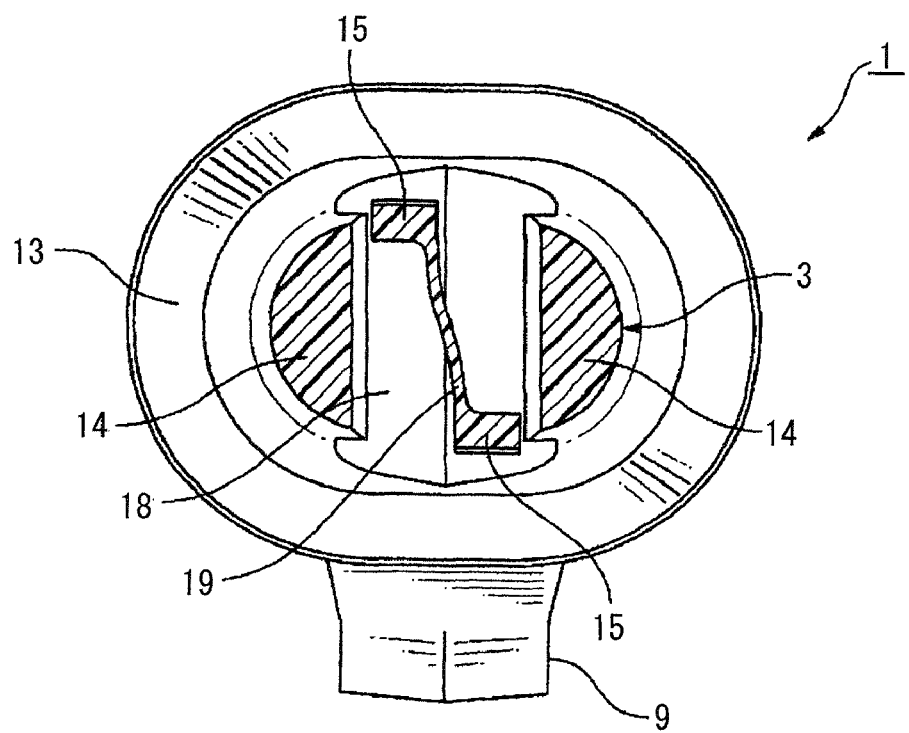
FIG. 5 is a sectional view of the clip taken along a line C-C of FIG. 2
Figure 6:
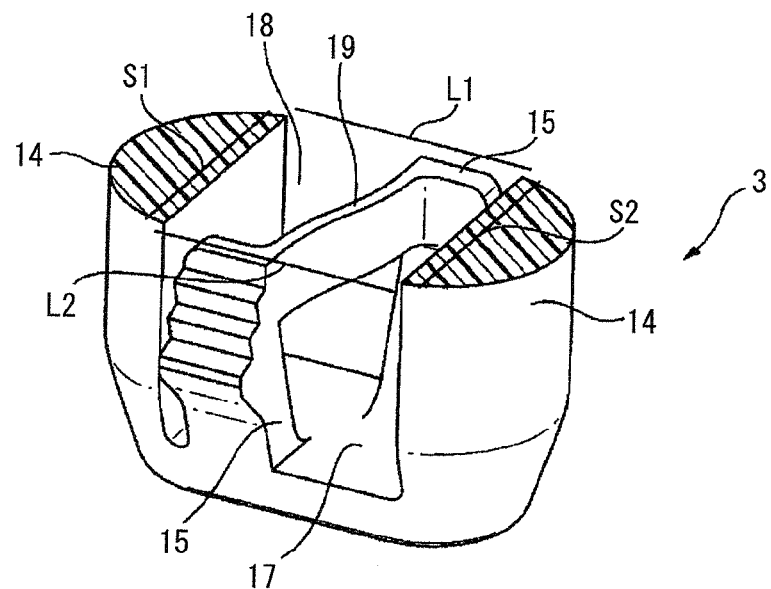
FIG. 6 is a perspective view of the fixing part obtained by cutting the clip of FIG. 2 along the line C-C.

As shown in FIGS. 2, 3, and 6, the fixing part 3 consists of a hollow box-shaped block extended from the main body 2. The fixing part 3 is so formed as to have a rectangular or oblong contour having a pair of opposed long sides L1 and L2 and a pair of short sides S1 and S2 in its cross section (see FIG. 5 showing a cross section along the line C-C of FIG. 2 and FIG. 6 (perspective view obtained when the fixing part 3 is viewed downward from the line C-C of FIG. 2)). In the embodiment shown in the drawings, the fixing part 3 is formed as an oblong. As shown in FIG. 6, in the fixing part 3, each of a portion including the short side S1 and a portion including the short side S2 is constructed of a rigid semicircular column 14. A space is formed between the two columns

14. A portion including the long sides L1 and L2 is constructed of locking claws 15 (described later) and a space disposed between the locking claws 15 and the columns 14 of the portion including the short sides S1 and S2. An end portion (lower end portion) of the box-shaped block forming the fixing part 3 is constructed of a rigid plate-shaped body 17 connecting end portions (lower end portion) of the two columns 14 to each other. The fixing part 3 is constructed of the box-shaped block consisting of the rigid columns 14 and the plate-shaped body 17 constructing the end portion of the fixing part 3. This construction allows the fixing part 3 to have a high rigidity and is capable of decreasing shaking of the clip 1 in mounting the fixing part 3 on the mounting hole of the member on which the clip 1 is to be mounted and improving a mounting strength. As shown in FIGS. 1(A) and 7, the band 9 and the buckle 10 are formed on the main body 2 in such a way that the wire harness 5 which is the long member is held by the main body 2 with the longitudinal direction of the wire harness 5 being disposed along the long sides of the fixing part 3.

Figure 4:
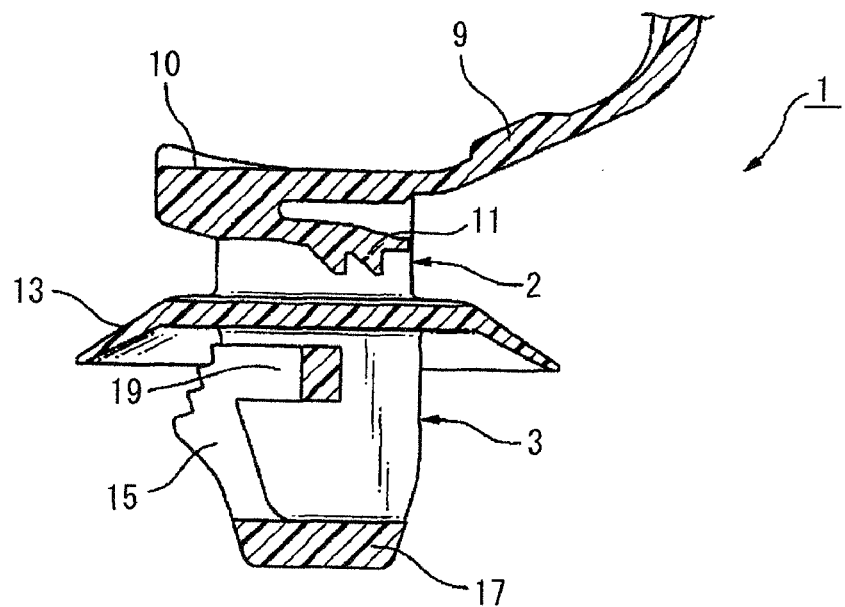
FIG. 4 is a sectional view of the clip taken along a line B-B of FIG. 2.

A pair of the locking claws 15 is formed on the fixing part 3. When the fixing part 3 is inserted into the mounting hole of the member on which the clip 1 is to be mounted, the locking claws 15 and the flange 13 of the main body 2 sandwich the member on which the clip 1 is to be mounted therebetween with the locking claws 15 being locked to the edge of the mounting hole. Thereby the fixing part 3 is mounted on the member on which the clip 1 is to be mounted. The locking claws 15 are disposed along a pair of the long sides L1 and L2 respectively to form a part of each of the long sides (FIGS. 3, 5, and 6) L1 and L2. A pair of the locking claws 15 is so disposed that in a cross section, one of the locking claws 15 is diagonal to the other locking claw 15. In detail, as shown in FIGS. 5 and 6, in the cross section, the locking claw 15 at the side of one long side L1 faces a space disposed at the side of the long side L2 facing the long side L1, whereas the other locking claw 15 at the side of the other long side L2 faces a space disposed at the side of the long side L1 facing the long side L2. Thereby in molding plastic, plastic can be easily molded without sliding, and further in inserting the fixing part 3 into the mounting hole, an easy insertion operation can be maintained without the two locking claws 15 interfering with each other when the two locking claws 15 fall inward. Furthermore the locking claws 15 are so formed as to form a part of the long sides L1 and L2 respectively and can be shifted longitudinally with respect to the oblong mounting hole of the member on which the clip 1 is to be mounted. Therefore in inserting the fixing parts 3 into a plurality of the mounting holes respectively, it is possible to absorb a variation in the pitch between clip-mounting positions or a variation in the pitch between mounting holes. As shown in FIGS. 6 and 4, each of the locking claws 15 rises from the plate-shaped body 17 disposed at the end portion of the fixing part 3 and is extended toward the flange 13. A locking shoulder disposed at the front end of each of the locking claws 15 is projected outward in a lateral direction from a side surface of the box-shaped block forming the fixing part 3. In inserting the fixing part 3 into the mounting hole of the member on which the clip 1 is to be mounted, each of the locking claws 15 falls inward owing to its elasticity. When the locking claws 15 penetrate through the mounting hole, they return to the original posture thereof owing to the elasticity thereof, with the locking shoulder thereof being locked to the edge of the mounting hole. The locking claws 15 and the flange 13 of the main body 2 sandwich the member on which the clip 1 is to be mounted therebetween. Thereby the clip 1 is mounted on the member on which the clip 1 is to be mounted. The multi-stage locking shoulder is formed at the front end of each of the locking claws 15. Thereby the clip 1 is capable of coping with the difference in the thickness of the member on which the clip 1 is to be mounted.

One of the locking claws 15 and the other locking claw 15 are connected to each other by an elastic locking claw connection piece 19 in a space 18 disposed at the center of the fixing part 3. The locking claw connection piece 19 is so formed as to apply elasticity to the locking claws 15 to allow them to protrude outward. The locking claw connection piece 19 consists of a thin elastic strip connecting the front ends of a pair of the locking claws 15 to each other. The locking claw connection piece 19 is so formed that it is flexed in an approximately gentle (large) S configuration in a cross section owing to inward falling of the locking claws 15 when the fixing part 3 is inserted into the mounting hole of the member on which the clip 1 is to be mounted. Thereby when the locking claws 15 are flexed inward, an easy insertion operation can be maintained without the locking claw connection piece 19 obstructing the flexing thereof. FIGS. 5 and 6 show that the locking claw connection piece 19 has the configuration of the gentle S when a force of making the locking claws 15 fall inward is not applied thereto. As described above, in the cross section of the fixing part 3, a pair of the locking claws 15 disposed diagonally along the long sides L1 and L2 is connected to each other with the elastic locking claw connection piece 19. Therefore besides the elasticity of the locking claws 15, the locking claw connection piece 19 imparts not only an overall rigidity, but also the elasticity to a pair of the locking claws 15 to allow them to protrude outward. Therefore the locking claw connection piece 19 increases the locking force of the locking claws 15. Thereby the locking claw connection piece 19 compensates a low rigidity of the locking claws 15 and allows the clip 1 to be fixed firmly to the member on which the clip 1 is to be mounted. Even when an external force of removing the clip 1 from the member on which the clip 1 has been mounted is applied to the clip 1, the locking claw connection piece 19 applies a sufficient force in a protrusion direction to the locking claws 15. Thus the locking claw connection piece 19 has a high removal prevention effect.

The operation of mounting the wire harness 5 which is the long member on the panel 6 which is the member on which the clip 1 is to be mounted by using the clip 1 having the above-described construction is described below with reference to FIG. 7. The wire harness 5 is placed on a base portion formed on the upper surface of the buckle 10 of the main body 2. With the band 9 being wound around the wire harness 5 and holding the wire harness 5, the band 9 is inserted into the guide hole of the buckle 10, and the front end of the band 9 is strongly pulled out of the buckle 10. The locking claw 11 of the buckle 10 is locked to the ratchet claw of the band 9. Thereby the clip 1 is fixed to the predetermined position of the wire harness 5. Because the wire harness 5 is long, the clip 1 is fixed thereto at a plurality of positions. The clip 1 is fixed to the panel 6 by inserting the fixing part 3 thereof into the mounting hole 7 formed at the predetermined position of the panel 6. When the fixing part 3 is inserted into the mounting hole 7, the flange 13 of the main body 2 contacts the panel 6. By strongly pressing the fixing part 3 into the mounting hole 7, the elastic peripheral edge of the flange 13 elastically presses the panel 6. The locking shoulder disposed at the front end of each of the locking claws 15 of the fixing part 3 penetrates through the panel 6 and is locked to the edge of the mounting hole 7. When the fixing part 3 is inserted into the mounting hole 7, each of the locking claws 15 falls inward owing to its elasticity. When the locking shoulder of each of the locking claws 15 penetrates through the mounting hole 7, each locking claw 15 returns to its original posture owing to its elasticity, and the locking shoulder of the locking claw 15 is locked to the edge of the mounting hole 7. The locking claw 15 and the flange 13 of the main body 2 sandwich the panel 6 therebetween. Thereby the clip 1 holding the wire harness 5 is mounted on the panel 6, and the wire harness 5 is mounted on the panel 6. A pair of the locking claws 15 is connected to each other with the elastic locking claw connection piece 19. Besides the elasticity of a pair of the locking claws 15, the locking claw connection piece 19 imparts the elasticity to the locking claws 15 to allow them to protrude outward. Therefore the locking claw connection piece 19 increases the locking force of the locking claws 15. Thereby the locking claw connection piece 19 compensates a low rigidity of each of the locking claws 15 and allows the clip 1 to be firmly fixed to the member on which the clip 1 is to be mounted. The peripheral edge of the flange 13 formed in the shape of a sucker has the elasticity of pressing the panel 5. Thereby the peripheral edge of the flange 13 is capable of absorbing the shaking of the clip 1 after the clip 1 is mounted on the panel 5 and enhances the locking force of the locking claws 15 of the fixing part 3.

As described above, because the wire harness 5 is long, the clip 1 is fixed thereto at a plurality of positions in many cases. The clip 1 is mounted on the mounting holes 7 formed at a plurality of predetermined positions of the panel 6. In that case, there is a case where the interval, namely, the pitch between the clips 1 and the interval, namely, the pitch between the mounting holes shift from each other. The clip 1 of the embodiment shown in the drawings is so constructed that the shift of the pitch is corrected and can be absorbed. In FIGS. 7 and 8, the mounting hole 7 of the panel 6 is formed as an oblong long in the longitudinal direction of the wire harness 5. The band 9 and the buckle 10 are formed on the main body 2 in such a way that the wire harness 5 is held by the main body 2 with the longitudinal direction of the wire harness 5 being disposed along the long sides of the fixing part 3. The fixing part 3 is so formed as to have the rectangular or oblong contour in its cross section. The locking claws 15 are disposed along a pair of the long sides L1 and L2 respectively to form a part of the long sides L1 and L2 respectively in the cross section of the fixing part 3. As shown with two arrows 21 in FIG. 8, the locking claws 15 are protruded outward. When there is a difference in the pitch between a plurality of the clips 1 and in the pitch between a plurality of the mounting holes, the locking claws 15 can be shifted in a direction shown with the arrows 22 of FIGS. 7 and 8. Thereby it is possible to absorb the variation in the pitch between the clip-mounting positions or the variation in the pitch between the mounting holes in inserting the clips into a plurality of the mounting holes.

What is claimed is:

1. A clip comprising a fixing part inserted into a mounting hole of a member on which said clip is to be mounted and a main body formed integrally with said fixing part, wherein when said fixing part is inserted into said mounting hole of said member on which said clip is to be mounted, an elastic locking claw formed on said fixing part and said main body sandwich said member on which said clip is to be mounted therebetween with said elastic locking claw being locked to an edge of said mounting hole, whereby said clip is mounted on said member on which said clip is to be mounted, and said fixing part is composed of a hollow box-shaped block consisting of a pair of columns extended from said main body and a plate-shaped body connecting end portions of a pair of said columns to each other; and said fixing part composed of said hollow box-shaped block is so formed as to have a rectangular or oblong contour having a pair of opposed long sides and a pair of short sides in a cross section of said fixing part; said locking claw is projected from a pair of said plate-shaped body toward said main body to form a part of each of said long sides; a pair of said locking claws is so disposed that said one locking claw is diagonal to said other locking claw; a front end of said one locking claw and a front end of said other locking claw are connected to each other with an elastic locking claw connection piece consisting of a thin band-shaped strip in a space disposed at a center of said fixing part; and said locking claw connection piece is so formed as to apply an elasticity to a pair of said locking claws to allow said locking claws to protrude outward.

2. The clip of claim 1, wherein said columns of said fixing part and said plate-shaped body thereof are rigid.

3. The clip of claim 1, wherein said locking claw connection piece connects the front ends of the pair of said diagonally disposed locking claws to each other in such a way that said front ends of said locking claws are approached to each other; and said locking claw connection piece is so formed as to be flexed in an approximately S-shaped configuration in said cross section owing to inward falling of said locking claws and owing to a combination of said band-shaped strips and a pair of said locking claws continuous with both ends of said band shaped strip when said fixing part is inserted into said mounting hole of said member on which said clip is to be mounted.

4. The clip of claim 1, wherein a flange having an elastic peripheral edge is formed at a position of said main body adjacent to said fixing part.

5. The clip of claim 1, wherein said main body is provided with a band wound around a long member and a buckle holding a state in which said band is wound around said long member; and said band and said buckle are formed on said main body in such a way that said long member is held by said main body with a longitudinal direction of said long member being disposed along said long sides of said fixing part.

6. The clip of claim 1, wherein said main body is provided with a band wound around a wire harness and a buckle holding a state in which said band is wound around said wire harness; and said band and said buckle are formed on said main body in such a way that said wire harness is held by said main body with a longitudinal direction of said wire harness being disposed along said long sides of said fixing part.

* * * * *